United States Patent [19]
Allison et al.

[11] 4,352,589
[45] Oct. 5, 1982

[54] BLIND RIVETING AND SEALING SYSTEM

[75] Inventors: Kenneth C. Allison, Crystal Lake; William H. Cooley, Winnetka, both of Ill.

[73] Assignee: Almedco, Inc., Crystal Lake, Ill.

[21] Appl. No.: 284,824

[22] Filed: Jul. 20, 1981

[51] Int. Cl.³ .................. B25G 3/00; F16D 1/00; F16G 11/00

[52] U.S. Cl. .................... 403/408; 403/388; 403/243

[58] Field of Search ............ 403/243, 388, 405, 408; 411/500, 508, 509

[56] References Cited

U.S. PATENT DOCUMENTS

| | | | |
|---|---|---|---|
| 1,986,981 | 1/1935 | Ross | 403/408 X |
| 2,853,913 | 9/1958 | Rapata | 411/508 |
| 2,876,485 | 3/1959 | Cowles | 403/405 X |
| 3,309,955 | 3/1967 | Turnbull et al. | 411/509 |
| 3,704,486 | 12/1972 | Blacklock | 411/508 |
| 3,823,526 | 7/1974 | Rose | 403/408 |
| 4,050,771 | 9/1977 | Watson et al. | 403/408 X |

Primary Examiner—Wayne Shedd
Attorney, Agent, or Firm—Jacque L. Meister

[57] ABSTRACT

A blind riveting and sealing system for sealing circular openings in sheet type materials and for securing together plural sheets. Each of the sheets to be secured together has an identical size hole for accommodating the rivet of the invention in a force fit relationship. Additionally, one of the sheets has a reduced diameter step in the rivet receiving hole to form a resilient annular locking flange. The rivet of the invention has a necked down portion to form a beveled seat face. This beveled seat face engages the resilient annular locking flange to lock the rivet in position and seal the circular openings in the sheets.

14 Claims, 4 Drawing Figures

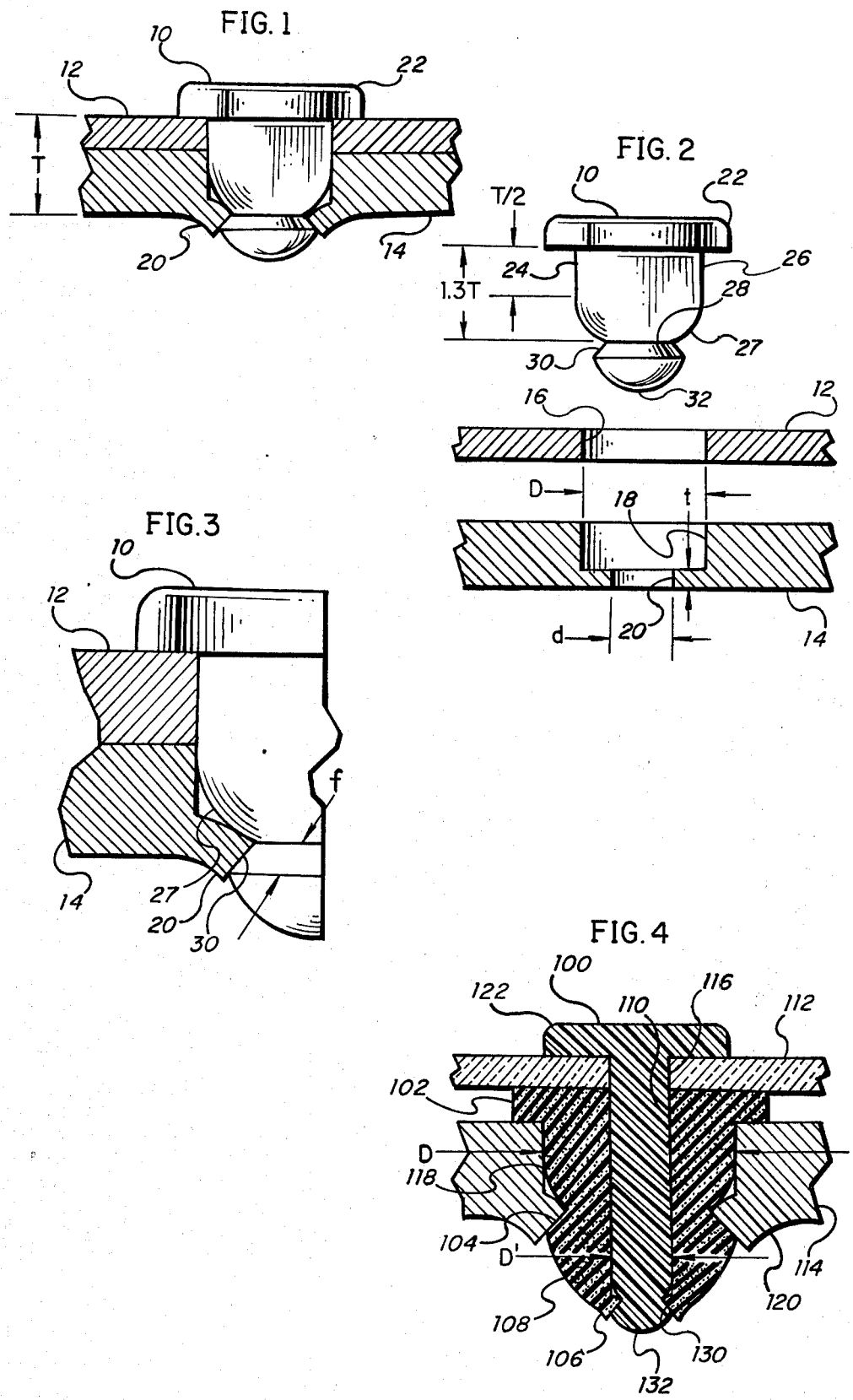

BLIND RIVETING AND SEALING SYSTEM

BACKGROUND OF THE INVENTION

This invention relates generally to blind rivets and more particularly to blind rivets adapted to lock in place and seal the openings in one or more apertured sheets whether or not there are spaces intervening between the sheets.

Blind rivets, that is rivets applied from one side of sheets of material without access to the other or hidden side of the sheet, are well known. Many of the prior art blind rivets comprise assemblies used to indirectly obtain access to the hidden side of the sheet. Still others of the prior art depend upon their cutting or forming an aperture as they are inserted and achieve their locking action by a grip that is analogous to that of a screw in sheet material. While the known blind rivets succeed in securing materials together, their basic design results in a number of limitations on their use in certain mass production fields and particularly in fields where inert, sterile applications are required. The multiple part blind rivets tend to be relatively costly, are easily contaminated and make imperfect seals. The "cutting" type are also expensive in that hardened materials are necessary and, the sharp cutting flutes tend to encourage the accumulation of contaminants and these also tend to be unable to achieve simple perfect seals.

SUMMARY OF THE INVENTION

A principal object of the invention is to provide a new and improved blind riveting system that overcomes the foregoing recited and other limitations of the prior art.

Still another object of the invention is to provide a new and improved blind riveting system using a one piece rivet that is readily produced at low cost.

Yet another object of the invention is to provide a new and improved blind riveting system that is capable of achieving perfect seals in circularly pierced deformable sheets.

And yet another object of the invention is to provide a new and improved blind riveting system that utilizes a smooth one piece rivet with no sharply angled surfaces.

And still another object of the invention is to provide a blind riveting system that permits construction of spaced apart sheets with the space between them sealed by blind rivets.

The foregoing and other objects of the invention are achieved in the preferred embodiment of the invention through a highly particular combinations of blind rivet and/or spacer dimensions and in the form and size of the aperture in a sheet or sheets to be fastened together. In the preferred embodiment, the insertion of the blind rivet into the perforation in the sheet, deforms the sheet which then engages the rivet at a beveled seat face. The nature of the invention and its several features and objects will appear more fully from the following description made in connection with the accompanying drawings.

DESCRIPTION OF THE DRAWINGS

FIG. 1 is a drawing, partly in section, illustrating the inventive system;

FIG. 2 is an exploded view of the arrangement of FIG. 1;

FIG. 3 is an enlarged sectional view illustrating the locking-sealing action of the inventive system; and FIG. 4 is a view of another embodiment of the inventive system in use to sealingly secure together in spaced apart relationship, two separate sheets.

DESCRIPTION OF THE PREFERRED EMBODIMENTS

FIGS. 1-3 are illustrative of the principal embodiment of the invention, a system employing a unique blind rivet 10 in use to sealingly secure together sheets 12 and 14 having circular shaped perforations into which the blind rivet is inserted. Sheet 12 has a circular shaped hole 16 therein and sheet 14 has a stepped hole 18, of substantially identical diameter, with a portion of the hole of reduced diameter resulting in an annular locking flange 20 therein whose axial thickness is sufficiently small, when considering the material of sheet 14, that it can be resiliently deformed by the application of substantially uniform pressure about the inner circumference of the annular flange.

In one representative embodiment employing polypropylene for sheet 14, and where the combined thickness T of sheets 12 and 14 is 0.060 inches, the thickness (t) of flange 20 is 0.007 inches thick. While this ratio is satisfactory for this material of this thickness, it should be appreciated that other flange thickness ratios between $\frac{1}{8}$ and 1/9 T will be required for other materials and, that the only reason for a stepped construction of hole 18 is to permit greater mechanical strength and rigidity in sheet 14.

Rivet 10 comprises a head 22 to which is integrally attached body 24. Head 22 is of sufficiently large diameter to permit its outside diameter to rest on a portion of sheet 12 or 14 that is not deformed by the locking action to be subsequently described. Body 24 comprises a constant diameter upper shank portion 26 adjacent to the head, a tapered portion 27 tapering from the constant diameter portion to a beveled locking seal face 30 and a pilot tip portion 32 adjacent to this seal face. The shank portion 26 of body 24 nearest the head is preferably of substantially constant diameter and, for enhanced sealing of the holes 16 and 18, is ideally sized for a "force" fit in those holes. For a diameter of holes 16 and 18 of 0.160 inches, the diameter of shank portion 26 in the preferred embodiment of the rivet, is between 0.162 and 0.164 inches.

The diameter of the upper shank portion 26 of rivet 10 is constant from beneath the head 22 for a distance that is less than T/2. Below the shank, the tapered body portion 27 gradually reduces from the force fit diameter tapering therefrom to a diameter 28 at a distance of approximately 1.3 T beneath the head 22. Diameter 28 is the top of beveled locking-seal face 30. Diameter 28 is approximately 70-85% of diameter 18 and at least 5% greater than the internal diameter of annular locking flange 20. The angle of the bevel on sealing face 30 depends on the resiliency of flange 20 with angles between 5° and 45° being typically employed. The particular angle is chosen to effect the touching relationship shown in FIG. 3; that is conterminous over the entire width of seal face 30. To insure reliable locking-sealing, the width f of sealing face 30 is made approximately 70 percent of t. For sheet material 16 with thickness of 0.060 inches, f is on the order of 0.005 inches. It has been determined that with these proportions, the best sealing and locking is achieved. The bottom end of the rivet is completed with a pilot tip portion 32 whose maximum diameter is substantially 20% larger than the internal diameter of annular locking flange 20. As here shown a rounded tip is presently preferred although truncated conical shapes are also useful.

In use, the sheets 12 and 14 are preliminarily positioned together with their holes 16 & 18 in approximate axial alignment. Blind rivet 10 is then engaged with the holes with the pilot tip portion serving to complete the hole alignment process as it passes successively through holes 16 and 18 and begins its passage past resilient annular locking flange 20. As the rivet continues to be inserted, the force fit of the upper portion of the body 26 in hole 16 begins and the leading edge of the pilot portion begins to deflect the flange 20 downward until, when the rivet head 22 contacts the upper surface of sheet 12, the inner surface of resilient locking flange 20 contacts and engages the rivet's locking-sealing face 30 as shown in FIGS. 1 and 3. Because flange 20 is resilient, the engagement of flange 20 and face 30 results both in a tight seal at that location and the rivet being tightly retained in the holes.

The sealing action takes place at three locations; the first at the engagement of flange 20 and sealing face 30; the second at the press fit engagement of body 26 in holes 16 and 18; and lastly, under the head 22 of rivet 10. As can be appreciated, the force fit seal also aids in locking the rivet in position.

Another embodiment of the invention is shown in FIG. 4. In the FIG. 4 embodiment blind rivet 100 and spacer 102 are employed to maintain and secure the seal of an airspace between two sheets 112 and 114. The intersheet space can be left void and used for heat insulation or filled with other materials to enhance the insulating or strength properties of the assembly. Such assemblies are adaptable for use as wall panels or windows or for any other use where its properties are desired. Sheets 112 and 114 have physical characteristics as to their rigidity and resiliency that are comparable to those of sheets 12 and 14 described in conjunction with FIGS. 1-3. Hole 116 and blind rivet 100 are sized for the same degree of force fit as previously described. Spacer 102 is fashioned to combine the characteristics of the blind rivet of the invention with the resiliency and the stepped hole—retaining flange heretofore described for sheet 14. Thus, when spacer 102 is inserted into sheet 114 it sealingly engages hole 118 of that sheet with a force fit and additionally is locked in position by flange 120 and deformable sealing face 104. The fits and proportions of sealing face 104 and pilot portion 108 are substantially the same as earlier described for sealing face 130 and pilot portion 132.

Rivet 100 is designed and constructed to engage spacer 102 in the same manner as previously described but with somewhat less of a force fit between the rivet body and the hole 110 in the spacer because of the greater length of their engagement when compared to rivet 10 and sheets 12 and 14. Obviously the process of sealing the space between two sheets as shown in FIG. 4 can be repeated as many times as desired with ascending rivet-spacer diameters to produce multiple spaced plates.

The invention has been described in detail herein with particular reference to preferred embodiments thereof. Additionally, it is contemplated that for certain embodiments, the blind rivet could be used as a sealing plug in a single sheet of material. In such an instance all proportions given herein with respect to thickness T would remain the same but that thickness would only be that of the single sheet. Of course, in still other embodiments, sheet 14 could be of relatively small size and function as a snap nut would do in sealing a single sheet where the stepped hole is not praticable or, to secure together 2 or more sheets of material. However, while each of these embodiments are described, it will be understood that variations and modifications can be effected within the spirit and scope of the invention described hereinabove and as defined in the appended claims.

What is claimed is:

1. A blind riveting system comprising, sheet means having a hole of diameter D with a smaller diameter step therein to thereby form a resilient annular locking flange in said hole, and rivet means inserted in said stepped hole and adapted to be locked in position therein by said resilient annular locking flange, said rivet means consisting of head means and body means wherein
    said head means has a diameter sufficiently larger than
    the maximum diameter (D) of said hole to prevent its insertion in said hole, and
    said body means comprises
        an upper shank portion having a diameter that results in a force fit with the diameter D position of the hole and thereby forming a first seal therebetween,
        a tapered portion,
        a beveled locking seal face for engaging said resilient annular flange over its entire width to thereby form a second seal therebetween,
    and a pilot tip portion.

2. A blind riveting system in accord with claim 1 wherein said sheet means comprises one or more sheets having a combined thickness of T and the combined length of said upper shank portion and said tapered portion, is substantially 1.3 T.

3. A blind riveting system in accord with claim 2 wherein said constant diameter portion of said upper shank is substantially T/2 long.

4. A blind riveting system in accord with claim 3 wherein the thickness t of said resilient annular locking flange is between ⅓ and 1/10 T.

5. A blind riveting system in accord with claim 4 wherein the minimum diameter of said tapered portion and said beveled locking seal face is at least 5% larger than the internal diameter d of said resilient inner locking flange and the maximum diameter of said beveled locking seal face is substantially 20% larger than said internal diameter d of said resilient annular locking flange.

6. A blind riveting system in accord with claim 5 wherein the width f of said beveled locking seal face is approximately 70% of t.

7. An improved blind riveting system for simultaneously sealing circular openings in one or more sheets of material and for locking plural sheets of material together, comprising, sheet means having hole's of diameter (D) with one sheet having a step in said hole of smaller diameter (d) to thereby form a resilient annular locking flange in said hole, and rivet means inserted in said hole and said stepped hole and adapted to be locked in position therein by said resilient annular locking flange, said rivet means consisting of head means and body means wherein said head means has a diameter sufficiently larger than the maximum diameter (D) of said holes to prevent its insertion in said holes, and said body means comprises
an upper shank portion having a diameter that results in a force fit with the diameter D portion of said holes to thereby form a first seal with each of said holes,
a tapered portion,
a beveled locking seal face for engaging diameter d of said resilient annular locking flange over its entire width to thereby form a second seal therebetween, and a pilot tip portion.

8. An improved blind riveting system in accord with claim 7 wherein said sheet means comprises a stack of n+1 sheets of combined thickness T where n is any integer equal to one or more, the combined length of said upper shank portion and said tapered portion of said rivet means is substantially 1.3 T and where the holes in each of said n sheets are of diameter D without steps therein and the stepped hole of diameters D and d is in only one sheet with the smallest diameter d at the edge of the stack.

9. An improved blind riveting system in accord with claim 8 wherein said constant diameter portion of said upper shank is substantially T/2 long.

10. An improved blind riveting system in accord with claim 9 wherein the thickness t of said annular locking flange is between ⅓ and 1/10 T.

11. An improved blind riveting system in accord with claim 10 wherein the minimum diameter of said tapered portion and said beveled locking seal face is at least 5% larger than the internal diameter of said resilient inner locking flange and the maximum diameter of said beveled locking seal face is substantially 20% larger than said internal diameter of said resilient annular locking flange.

12. An improved blind riveting system in accord with claim 11 wherein the width (f) of said beveled locking seal face is approximately 70% of t.

13. An improved blind riveting system for securing together in spaced apart relationship two or more sheets of material and for simultaneously sealing the rivet openings in the sheets comprising
a first top sheet having a hole of diameter D' therein
a second bottom sheet having a hole of diameter D with a smaller diameter d step therein to thereby form a first resilient annular locking flange therein, spacer means inserted in said stepped hole of said second bottom sheet and adapted to be locked in position therein by said first resilient annular locking flange, said spacer means consisting of head means and body means wherein said spacer's head means has a diameter larger than diameter D,
said spacer body means comprises an upper shank portion, a tapered portion, a beveled locking seal face and a pilot tip portion, and
said spacer's means has a stepped hole of diameter D' with a smaller diameter d' step therein to thereby form a second resilient annular locking flange therein, and rivet means inserted in said first top sheet and said spacer means and adapted to be locked in position therein by said second resilient annular locking flange in said spacer means, said rivet means consisting of head means and body means wherein said rivets head means has a diameter larger than diameter D', and said body means comprises an upper shank portion adapted for a press fit engagement with the diameter D' of said spacer means, a tapered portion, a beveled locking seal face adapted to engage said spacer's second resilient annular locking flange in a locking relationship, and a pilot tip portion.

14. An improved blind riveting and sealing system comprising
sheet means having a hole of diameter D with a smaller diameter step therein to thereby form a resilient annular locking flange in said hole, and
rivet means inserted in said stepped hole and adapted to be locked in sealing position therein by said resilient annular locking flange, said rivet means consisting of head means and body means wherein
said head means is substantially larger that said hole diameter D portion and is adapted to sealingly engage said sheet means to form a first sealing surface therebetween when said rivet means is fully inserted in said hole, and
said body means comprises
an upper shank portion having a contant diameter that is larger that the internal diameter D portion of said hole to simultaneously effect a force fit and a second sealing surface therebetween,
a tapered portion for simultaneously piloting said rivet means into said hole and maintaining said resilient annular locking flange in a locking-sealing position,
a beveled locking seal face for engaging said resilient annular locking flange to thereby simultaneously form a third seal therebetween and lock said rivet in said sealing position, and
a pilot tip portion for piloting said rivet means through said resilient annular locking flange while simultaneously deforming same toward said locking position.

* * * * *